United States Patent [19]
Matsue et al.

[11] Patent Number: 4,736,455
[45] Date of Patent: Apr. 5, 1988

[54] INTERFERENCE CANCELLATION SYSTEM

[75] Inventors: Hideaki Matsue; Takehiro Murase, both of Kanagawa, Japan

[73] Assignee: Nippon Telegraph and Telephone Corporation, Tokyo, Japan

[21] Appl. No.: 921,093

[22] Filed: Oct. 21, 1986

[30] Foreign Application Priority Data

| Dec. 23, 1985 | [JP] | Japan | 60-287881 |
| Mar. 20, 1986 | [JP] | Japan | 61-60856 |
| Mar. 20, 1986 | [JP] | Japan | 61-60857 |
| Apr. 3, 1986 | [JP] | Japan | 61-75555 |
| Apr. 3, 1986 | [JP] | Japan | 61-75556 |

[51] Int. Cl.$^4$ .............................................. H04N 1/06
[52] U.S. Cl. .................................. 455/138; 455/139; 455/272; 455/273; 455/276; 455/278
[58] Field of Search ............... 455/138, 139, 272, 273, 455/276, 278

[56] References Cited

U.S. PATENT DOCUMENTS

| 4,373,210 | 2/1983 | Karabinis et al. | 455/139 |
| 4,384,366 | 5/1983 | Kaitsuka | 455/139 |
| 4,498,885 | 2/1985 | Namiki | 455/278 |
| 4,584,712 | 4/1986 | Isobe et al. | 455/276 |

*Primary Examiner*—Michael A. Masinick
*Attorney, Agent, or Firm*—Armstrong, Nikaido, Marmelstein & Kubovcik

[57] ABSTRACT

An interference cancellation system at a receiver side for digital radio system has a first quadrature phase detector for demodulating the main signal. A second quadrature phase detector (or a phase detector) is supplied with the same reference carrier and clock signal as that of the first quadrature phase detector, for phase detecting an interference signal. A decision circuit is coupled with the first quadrature phase detector to provide a baseband signal. An error signal detector provides a difference between a decision level of a digital signal and an input of the decision circuit due to the interference signal. A correlation device provides a correlation signal between an error signal and a phase detected interference signal. A control device provides a compensation signal which has the same amplitude and anti-phase as those of the interference component included in the main signal according to the correlation signal. A combiner combines the main signal with the compensation signal to provide a compensated main signal which is free from interference. A combiner and a control means may be inserted either in an RF stage or an IF stage, or in a baseband stage. An error signal detector and decision circuit are implemented by an A/D converter. A correlation means is implemented by a digital or analog multiplier and integrators.

10 Claims, 17 Drawing Sheets

INTERFERENCE CANCELLATION SYSTEM

BACKGROUND OF THE INVENTION

The present invention relates to an interference cancellation system which cancels an undesired interference signal in a radio communication receiver.

A principle system for cancelling an interference signal is shown in FIG. 17. In FIG. 17, the reference numeral 201 is a main antenna which receives both the desired signal and the undesired interference signal, 202 is an auxiliary antenna which receives only an undesired interference signal, 203 is an amplitude-phase control circuit, 204 is a combiner, 205 is a correlation detector, 207 and 208 are frequency converters each of which includes an amplifier, 209 is a low-pass filter, and 206 is an output terminal which provides the output signal which is free from an interference signal. The main antenna 201 is directed to a desired signal, but receives both the desired signal and the undesired interference signal. The auxiliary antenna 202 is directed to the undesired interference signal, and receives only the interference signal. The interference signal received by the auxiliary antenna 202 is applied to the amplitude-phase control circuit 203 which adjusts the amplitude and the phase of the interference signal so that the output of the control circuit 203 has the equal amplitude and the anti-phase as that of the interference signal received by the main antenna 201. Thus, when the combiner 204 combines the interference signal from the main antenna with the output of the amplitude-phase control circuit 203, the interference signal is cancelled, and the desired signal is obtained at the output of the combiner. The control signal for controlling the amplitude-phase control circuit 203 is obtained by the correlation detector 205, which provides the correlation between the undesired signal received by the main antenna 201 and the undesired interference signal received by the auxiliary antenna 202.

However, when the apparatus of FIG. 17 is implemented, a correlation circuit, and a control circuit must satisfy many requirements, which are not easy. Therefore, the mere principle circuit of FIG. 17 is not practical.

The practical circuit in a prior art is shown in the U.S. Pat. No. 4,384,366 (the corresponding West German Pat. No. P31 10 602, the UK Pat. No. 2072995, the French No. 8106258, Canadian Pat. No. 1,167,158). In that circuit, a single frequency converter is used, and an interference signal is applied to an amplitude-phase control circuit which provides the compensation signal having the equal amplitude and the anti-phase to a combiner in a main signal path. In order to adjust amplitude and phase of a control signal in the amplitude-phase control circuit, the control signal is subject to perturbation by low frequency signal. The residual interference component is fluctuated in accordance with the low frequency signal. The residual interference component is detected by an envelope detector. And the correlation is taken between a residual interference component and the low frequency signal. The control is effected so that the correlation is the smallest.

However, the technique has the disadvantage that a circuit structure is complicated, because of the presence of a perturbation circuit, and an additional envelope detector.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 1:
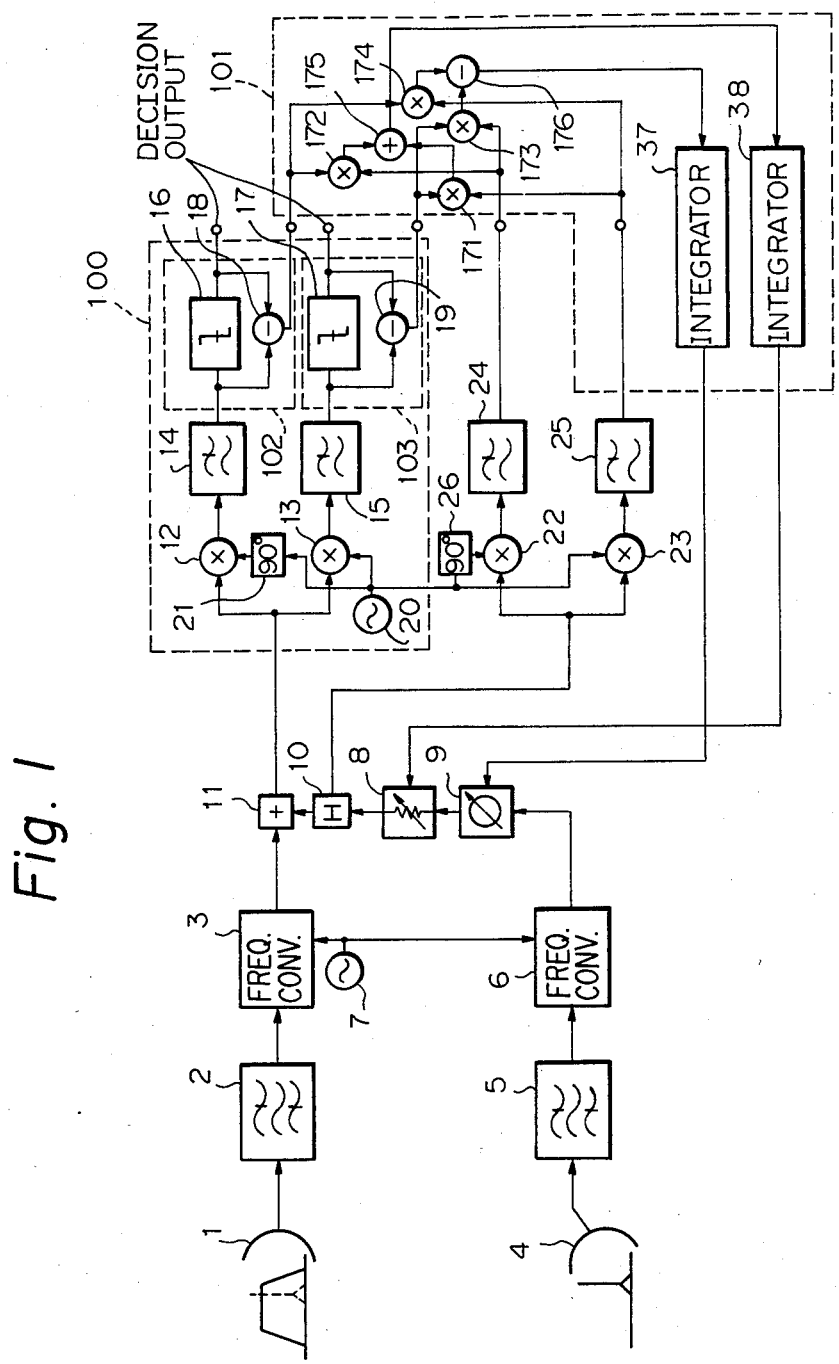
FIG. 1 is a block diagram of the interference cancellation system according to the present invention.

FIG. 1 shows a block diagram of an interference cancellation system according to the present invention. The numeral 1 is a main antenna which receives both a desired main signal and an undesired interference signal, and the numeral 4 is an auxiliary antenna which receives only the undesired interference signal. The main signal received by the main antenna 1 is applied to the frequency converter 3 which converts the radio frequency to the IF (intermediate frequency), through the bandpass filter 2. The interference signal received by the auxiliary antenna 4 is applied to another frequency converter 6 through the bandpass filter 5. The common local oscillator 7 supplies the local frequency to both the frequency converters 3 and 6. The interference signal at the output of the frequency converter 6 is applied to the combiner 11 through the variable phase shifter 9, the variable attenuator 8 and the signal divider 10. The combiner 11 combines the main signal which includes the interference signal with the output of the divider 10 so that the interference component in the main signal is cancelled. The output signal of the divider 10 has the same amplitude and the anti-phase as those of the interference signal in the main signal.

The main signal at the input of the combiner 11 is expressed as follows.

$$Y_1(t) = \sum_{k=-\infty}^{\infty} (a_k + jb_k)r(t - kT)e^{j\omega_1 t} + f(t)e^{j(\omega_2 t + \theta)} \quad (1)$$

When the main signal is 16 QAM (quadrature amplitude modulation signal with 16 levels), $a_k$, and $b_k$ are ($\pm 1$, $\pm 3$). The r(t) is the impulse response of the whole system, and when the system is the Nyquist transmission system, $r(0)=1$, and $r(kT)=0$, where k is an integer and $k \neq 0$. The symbol T is a clock period, $\omega_1$ is an angular frequency of the carrier wave of the main signal. It is supposed that the interference signal is an amplitude modulation signal, and f(t) is the amplitude, $\theta$ is the phase and $\omega_2$ is the angular frequency of the interference signal.

The output of the divider 10 applied to the combiner 11 is expressed as follows when the system operates correctly.

$$Y_2(t) = (f(t) + \Delta r)e^{j(\omega_2 t + \theta + \Delta\theta + \pi)} \quad (2)$$

where $\Delta r$, and $\Delta\theta$ are supposed to be very small.

Figure 2:
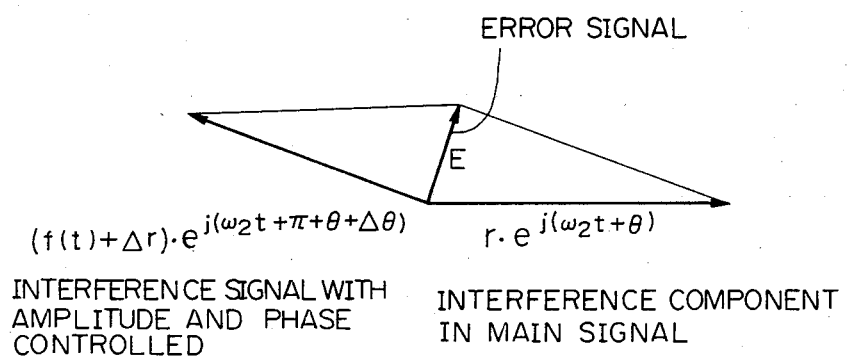
FIG. 2 is a vector diagram which shows operation of FIG. 1.

The combiner 11 adds the signals of the equations (1) and (2), and the residual interference component E is shown in the vector diagram in FIG. 2, where the residual interference component E is the vector difference between the interference component in the main signal, and the interference signal at the output of the divider 10.

The output of the combiner 11 which includes the residual interference component is applied to the demodulator 100 which has a pair of coherent quadrature phase detectors 12 and 13, and a pair of low-pass filters 14 and 15. The in-phase component $i_1(t)$ and the quadrature component $q_1(t)$ at the outputs of the filters 14 and 15, respectively, are expressed as follows.

$$i_1(t) = \sum_{k=-\infty}^{\infty} a_k r(t - kT) + \quad (3)$$
$$[-\Delta r \cos(\Delta\omega t + \theta) + f(t)\Delta\theta \sin(\Delta\omega t + \theta)]$$

$$q_1(t) = \sum_{k=-\infty}^{\infty} b_k r(t - kT) + \quad (4)$$
$$[-\Delta r \sin(\Delta\omega t + \theta) - f(t)\Delta\theta \cos(\Delta\omega t + \theta)]$$

On the other hand, the interference component which is divided by the divider 10 is applied to the quadrature phase detectors 22 and 23, which use the same local frequency 20 as that of the previous phase detectors 12 and 13 for the main signal. The outputs of the detectors 22 and 23 are applied to the low-pass filters 24 and 25. Thus, the in-phase component $i_2$ and the quadrature component $q_2$ of the interference signal at the outputs of the filters 24 and 25 are expressed as follows.

$$i_2(t) = (f(t) + \Delta r) \cos(\Delta\omega t + \theta' + \Delta\theta + \pi) \approx -f(t) \cos(\Delta\omega t + \theta') \quad (5)$$

$$q_2(t) = (f(t) + \Delta r) \sin(\Delta\omega t + \theta' + \Delta\theta + \pi) \approx -f(t) \sin(\Delta\omega t + \theta') \quad (6)$$

where $\Delta\omega$ is the difference between $\omega_1$ and $\omega_2$, and $\theta'$ is the initial phase difference.

The demodulated main signals at the outputs of the low-pass filters 14 and 15 are applied to the decision circuits 16 and 17, respectively. The outputs of the decision circuits 16 and 17 are the baseband digital signal.

The error signal is obtained by taking the difference between the output signal and the input signal of the decision circuit. The error signal detectors 102 and 103 provide the difference, and provide the in-phase error signal $E_i(t)$ and the quadrature error signal $E_q(t)$, respectively, as shown below.

$$E_i(t) = -\Delta r \cos(\Delta\omega t + \theta) + f(t)\Delta\theta \cdot \sin(\Delta\omega t + \theta) \quad (7)$$

$$E_q(t) = -\Delta r \sin(\Delta\omega t + \theta) - f(t)\Delta\theta \cdot \cos(\Delta\omega t + \theta) \quad (8)$$

The correlation between the error signals of the equations (7) and (8), and the interference signals of the equations (5) and (6) are taken in the control circuit 101.

The multiplier 171 provides the product of $i_2(t)$ and $E_i(t)$, and the multiplier 172 provides the product of $q_2(t)$ and $E_q(t)$, respectively. The following signal is obtained at the output of the low-pass filter 38 which receives the output of either the multiplier 171 or the multiplier 172.

$$i_2(t) \times E_i(t) = q_2(t) \times E_q(t) = f(t)\Delta r \cos(\theta - \theta') \quad (9)$$

The control signal applied to the low-pass filter 38 is the sum of the outputs of the multipliers 171 and 172 in the embodiment of FIG. 1 so that the control gain is higher.

Similarly, the multiplier 173 which provides the product of $q_2(t)$ and $E_i(t)$, the multiplier 174 which provides the product of $i_2(t)$ and $E_q(t)$, and the low-pass filter 37 provide the following control signal.

$$q_2(t) \times E_i(t) = -i_2(t) \times E_q(t) = -f^2(t)\Delta\theta \cos(\theta - \theta') \quad (10)$$

The control signal applied to the low-pass filter 37 is the difference of the multipliers 173 and 174 so that the higher control gain is obtained.

It should be appreciate that the symbol $\theta$ and the symbol $\theta'$ show the initial phase, and do not fluctuate. So, when the initial phase is set so that $\theta = \theta'$ is satisfied, the equation (9) is proportional to $\Delta r$, and the equation (10) is proportional to $\Delta\theta$.

Therefore, the result of the equation (9), which is the output of the low-pass filter 38, can control the variable attenuator 8, and the result of the equation (10), which is the output of the low-pass filter 37, can control the variable phase shifter 9 so that $\Delta r$ and $\Delta\theta$ are controlled to provide the cancellation of the interference component included in the main signal.

Figure 3:
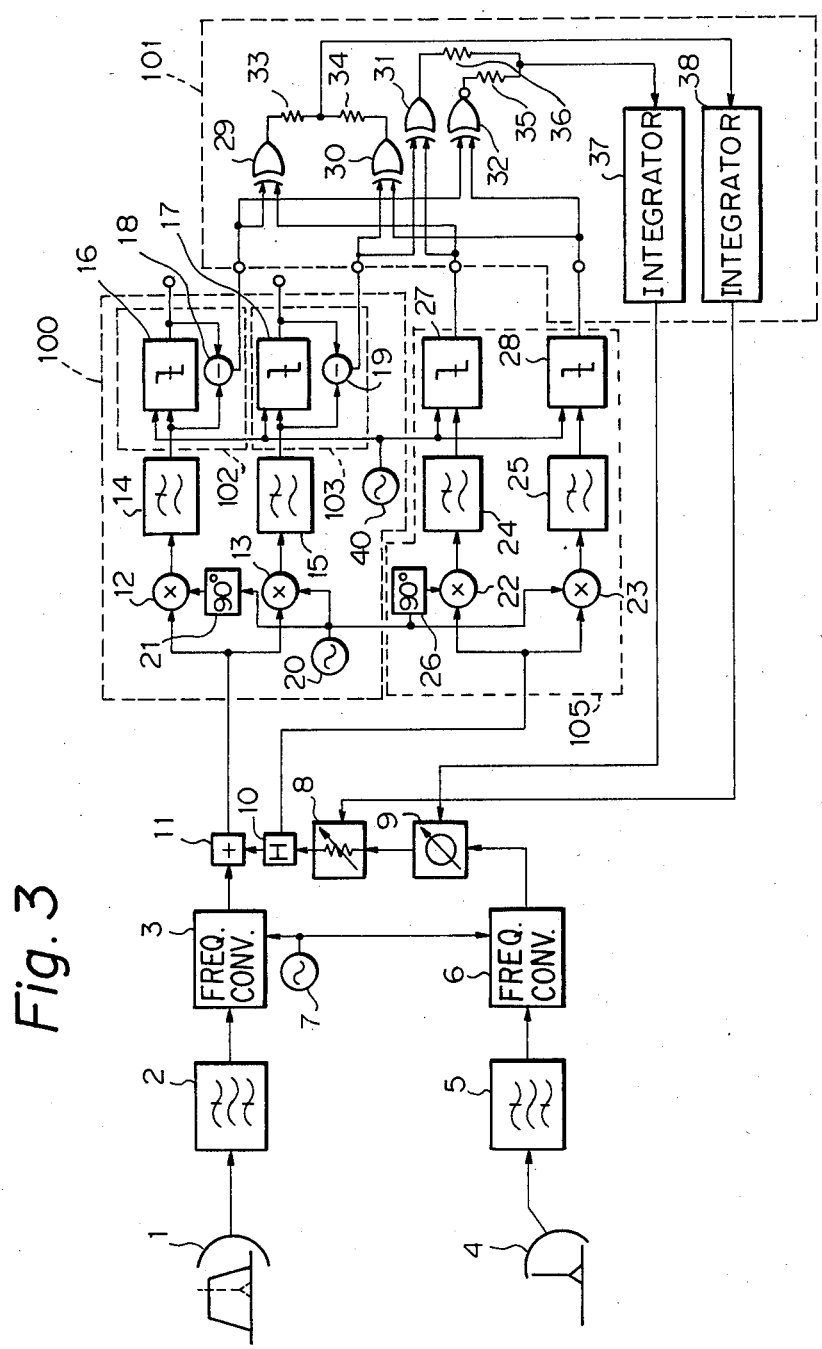
FIG. 3 is a block diagram of another embodiment of the present interference cancellation system according to the present invention.

FIG. 3 shows the modification of the interference cancellation system of FIG. 1. In FIG. 3, both the main signal and the interference signal are detected by the quadrature phase detectors 12, 13, 22 and 23, by using the common recovered carrier wave 20, and the detected signals are processed by the low-pass filters 14, 15, 24 and 25. The detected main signals are applied to the decision circuits 16 and 17. The subtractors 18 and 19 provide the difference between the input of the decision circuit and the output of the decision circuit. The polarity of the difference is the same as the polarity of the interference component included in the main signal.

Figure 4:
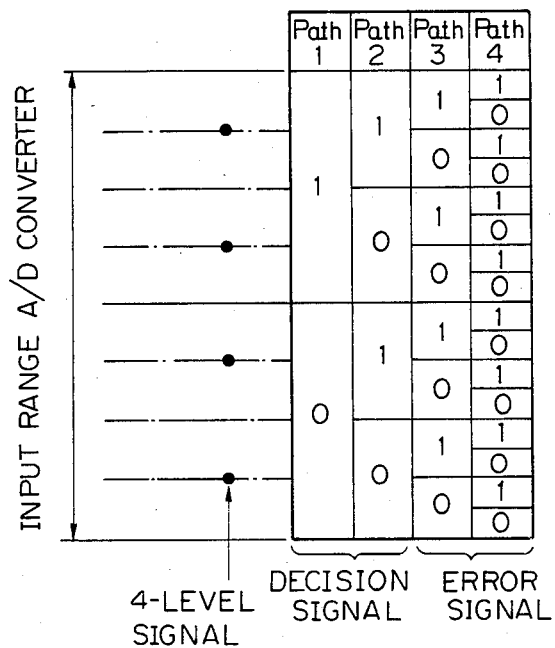
FIG. 4 shows operation of an A/D converter which provides both a decision signal and an error signal.

FIG. 4 shows the above operation in case of a 16 QAM signal, which provides a pair of 4 level demodulated signals. The decision circuit and a subtractor for providing the error signal are implemented by an A/D converter which has 3 output bits. Among the output bits of the A/D converter, the highest 2 bits provide the decision signal with 4 levels, and the third bit shows the polarity or the sign of an error signal.

When the error signal is positive, the polarity is indicated by "1", and when the error signal is negative, the polarity is indicated by "0", so that the error signals are calculated by using an exclusive-OR circuit.

A polarity of an error signal which is sampled for every clock period T is shown by the following equations.

$$\text{sgn}[E_i(mT)] = \text{sgn}[-\Delta r \cdot \cos(\Delta\omega mT + \theta) + f(t)\Delta\theta \sin(\Delta\omega mT + \theta)] \quad (11)$$

$$\text{sgn}[E_q(mT)] = \text{sgn}[-\Delta r \cdot \sin(\Delta\omega mT + \theta) - f(t)\Delta\theta \cos(\Delta\omega mT + \theta)] \quad (12)$$

On the other hand, the decision circuits 27 and 28 provide the polarity of the sign of the interference signal as shown in the following equations, where it is supposed that the sampling clock signal 40 for the interference signal is the same as that of the main signal.

$$\text{sgn}[i_2(mT)] = -\text{sgn}[\cos(\Delta\omega mT + \theta')] \quad (13)$$

$$\text{sgn}[q_2(mT)] = -\text{sgn}[\sin(\Delta\omega mT + \theta')] \quad (14)$$

When the equations (13) and (14) are compared with the equations (5) and (6), it is noted that the f(t) is omitted in the equations (13) and (14), because the equations (13) and (14) calculate only the sign or the polarity, and the sign of the f(t) is positive.

Next, the following calculations are carried out for sgn[$E_i$(mT)], sgn[$E_q$(mT)], sgn[$i_2$(mT)], and sgn[$q_2$(mT)].

First, the digital multiplication of sgn[$i_2$(mT)] and sgn[$E_i$(mT)] by using the exclusive-OR circuit 30 and the low-pass filter 38 provides the signal shown by the following equation.

$$\text{sgn}[i_2(mT)] \times \text{sgn}[E_i(mT)] = -\text{sgn}[-\Delta r \cos(\theta - \theta') + f(t)\Delta\theta \sin(\theta - \theta')] \quad (15)$$

Similarly, $$\text{sgn}[q_2(mT)] \times \text{sgn}[E_q(mT)] = -\text{sgn}[-\Delta r \cos(\theta - \theta') + f(t)\Delta\theta \sin(\theta - \theta')] \quad (16)$$

Similarly, $$\text{sgn}[q_2(mT)] \times \text{sgn}[E_i(mT)] = -\text{sgn}[\Delta r \sin(\theta - \theta') + f(t)\Delta\theta \cos(\theta - \theta')] \quad (17)$$

Similarly, $$-\text{sgn}[i_2(mT)] \times \text{sgn}[E_q(mT)] = -\text{sgn}[\Delta r \sin(\theta - \theta') + f(t)\Delta\theta \cos(\theta - \theta')] \quad (18)$$

When $\theta = \theta'$ is assumed as is the case of the embodiment of FIG. 1, the equations (19) and (20) are obtained, and the amplitude error $\Delta r$, and the phase error $\Delta\theta$ are obtained.

$$\text{sgn}[i_2(mT)] \times \text{sgn}[E_i(mT)] = \text{sgn}[q_2(mT)] \times \text{sgn}[E_q(mT)] = +\text{sgn}(\Delta r) \quad (19)$$

$$\text{sgn}[q_2(mT)] \times \text{sgn}[E_i(mT)] = -\text{sgn}[i_2(mT)] \times \text{sgn}[E_q(mT)] = -\text{sgn}(\Delta\theta) \quad (20)$$

Accordingly, the result of the equation (19) (the output of the low-pass filter or the integrator 38) can control the variable attenuator 8, and the result of the equation (20) (the output of the low-pass filter or the integrator 37) can control the variable phase shifter 9. Thus, the interference component in the main signal is cancelled. As the result of the equation (15) is the same as that of the equation (16), and the result of the equation (17) is the same as that of the equation (18), the embodiment of FIG. 3 takes the sum of the two signals in order to increase the control gain.

Some modifications of FIGS. 1 and 3 are possible to those skilled in the art.

For instance, a variable attenuator, and a variable phase shifter may be inserted in an RF (radio frequency) stage which is up-stream of a frequency converter, instead of an IF (intermediate frequency) stage of FIGS. 1 and 3.

An interference component is not restricted to an amplitude modulation signal, but also any modulation signal may be cancelled by the present invention, although the above embodiment is directed to an amplitude modulation signal as an interference signal.

Further, an interference signal received by an auxiliary antenna may be divided at the input of the variable phase shifter, or at the input of the variable attenuator. In that case, the divided interference component may have a higher level than that of the embodiments of FIGS. 1 and 3 which divide the interference component at the output of the variable attenuator 8. When the divided interference component has a higher level, the sensitivity in the quadrature phase detection is increased. In that case, (f(t)+$\Delta r \approx r$) in the equation (2) is replaced by another value r', which is positive value as well as r, and the equations (9), (10), (19) and (20) are satisfied when r is replaced by r'. Therefore, the control of the amplitude and the phase for interference component is possible.

Figure 5:
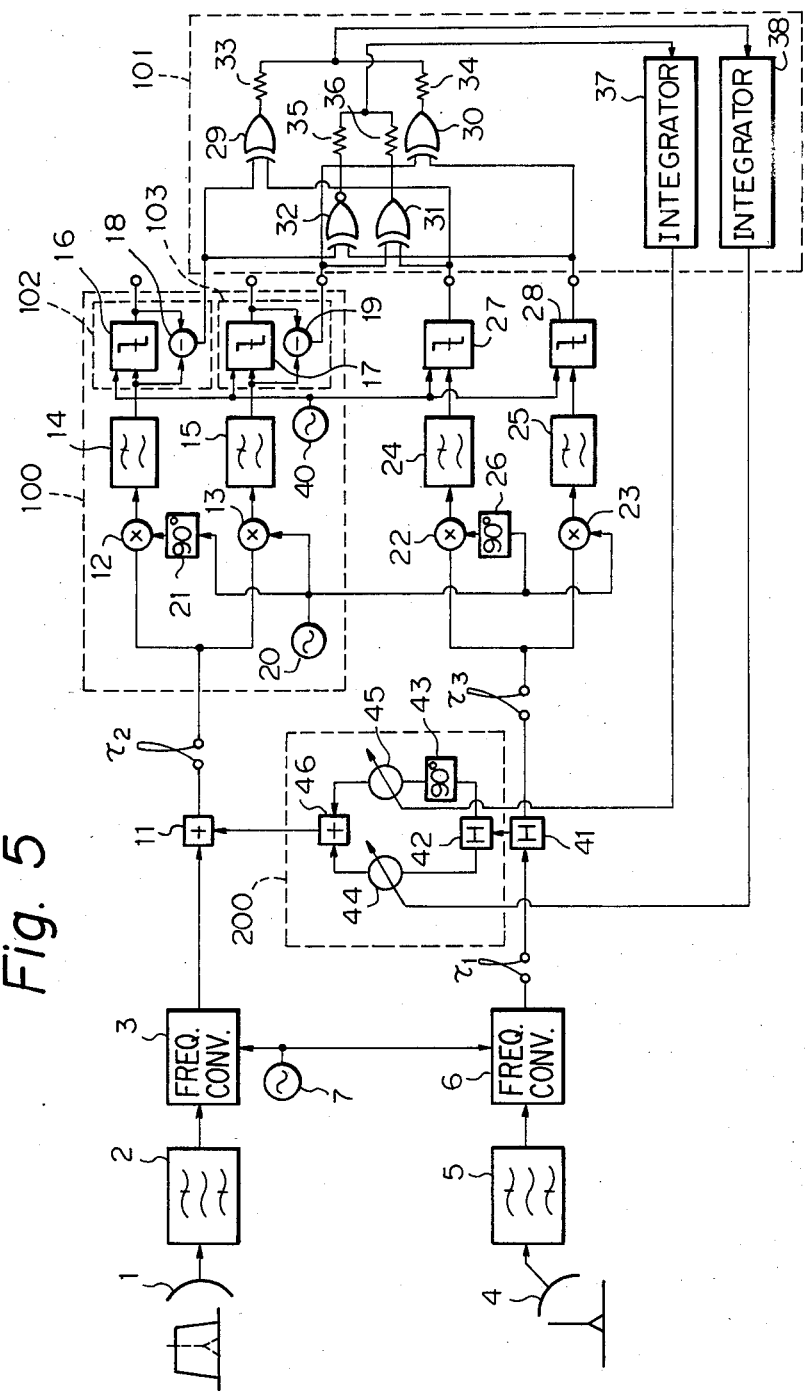
FIG. 5 is a block diagram of still another embodiment of the interference cancellation system according to the present invention.

FIG. 5 shows the modification of the embodiment of FIG. 3. The features of the embodiment of FIG. 5 are the use of a quadrature amplitude modulator 200 instead of a variable attenuator and a variable phase shifter, and the use of delay lines ($\tau_1$), ($\tau_2$), and ($\tau_3$).

The quadrature amplitude modulator 200 has the divider 42 (or a hybrid circuit) for separating signals to two paths, a bipolar attenuator 44 which receives one of the outputs of the divider 42, a 90° phase shifter 43 coupled with another output of the divider 42, another bipolar attenuator 45 coupled with output of the 90° phase shifter 43, and a combiner 46 for combining outputs of the bipolar attenuators 44 and 45. The output of the combiner 46 is applied to the combiner 11 which combines the main signal with the output of the quadrature amplitude modulator 200. A bipolar attenuator 44, (or 45) operates in both polarities, positive polarity, and negative polarity. The bipolar attenuators 44 and 45 are controlled by the outputs of the low-pass filters (or the integrators) 38, and 37, respectively. The input to the divider 42 is separated by the divider 41 which is inserted in an interference signal path.

The delay lines ($\tau_1$), ($\tau_2$) and ($\tau_3$), which are inserted at the output of the frequency converter 6, at the output of the combiner 11, and at the output of the divider 41, respectively, function to coincide the timing of the main signal and the compensation signal at the combiner 11. Those delay lines are useful to improve the effect of the cancellation of the interference component.

Figure 6:
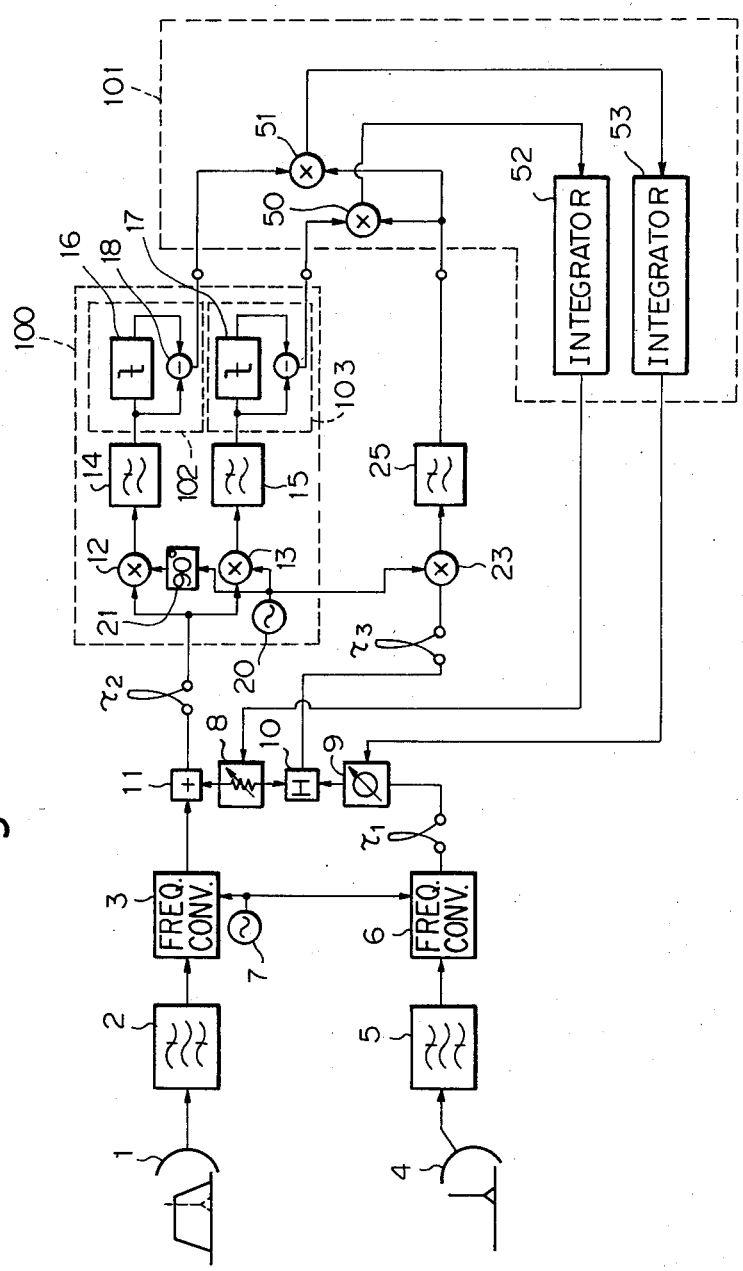
FIG. 6 is a block diagram of still another embodiment of the interference cancellation system according to the present invention.

FIG. 6 shows another embodiment of the interference cancellation system according to the present invention. The feature of FIG. 6 as compared with the embodiment of FIG. 1 is the use of an ordinary phase detector 23, instead of a quadrature phase detector 22, 23 in FIG. 1. The delay lines ($\tau_1$), ($\tau_2$), and ($\tau_3$) are used in the embodiment of FIG. 6. The phase detector 23 in FIG. 6 is supplied the common recovered carrier 20 as that of the quadrature phase detector 12 and 13 for the main signal.

In the embodiment of FIG. 6, $q_2(t)$ in the equation (6) does not exists. Accordingly, the equations (9) and (10) are changed as follows, respectively.

$$i_2(t) \times E_i(t) = f(t)\Delta r \cos(\theta - \theta') \quad (9')$$

$$i_2(t) \times E_q(t) = f^2(t)\Delta\theta \cos(\theta - \theta') \quad (10')$$

Therefore, the embodiment of FIG. 6 operates similar to that of FIG. 1, except that the sensitivity of FIG. 6 is a little lower than that of FIG. 1 due to the non-existance of adder 175 and subtractor 176.

Figure 7:
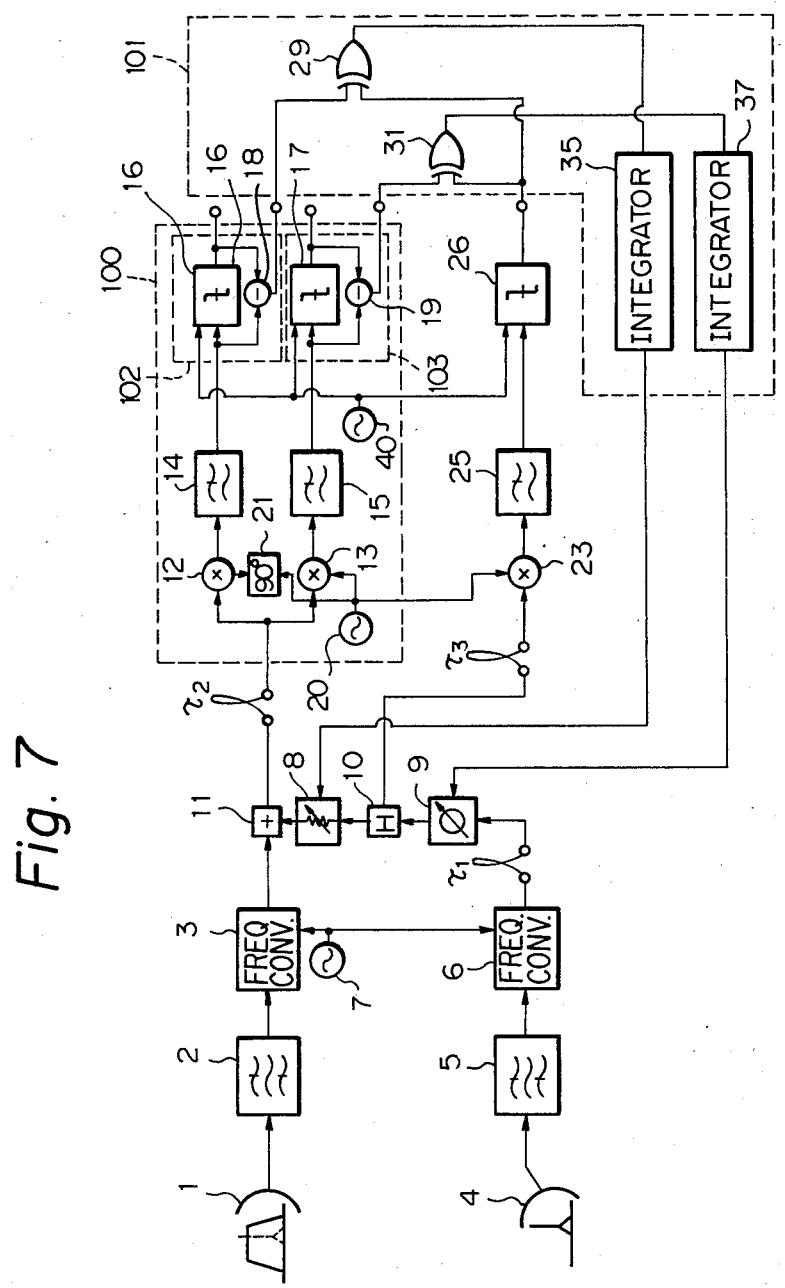
FIG. 7 is a block diagram of still another embodiment of the interference cancellation system according to the present invention.

FIG. 7 is the modification of FIG. 6, and the feature of FIG. 7 is the use of the decision circuit 26 in the interference signal path, and the use of the exclusive-OR circuits 29 and 31 in the correlation circuit 101. The use of the decision circuit in the interference path together with the exclusive-OR circuit in the correlation circuit are described in accordance with FIG. 3.

Figure 8:
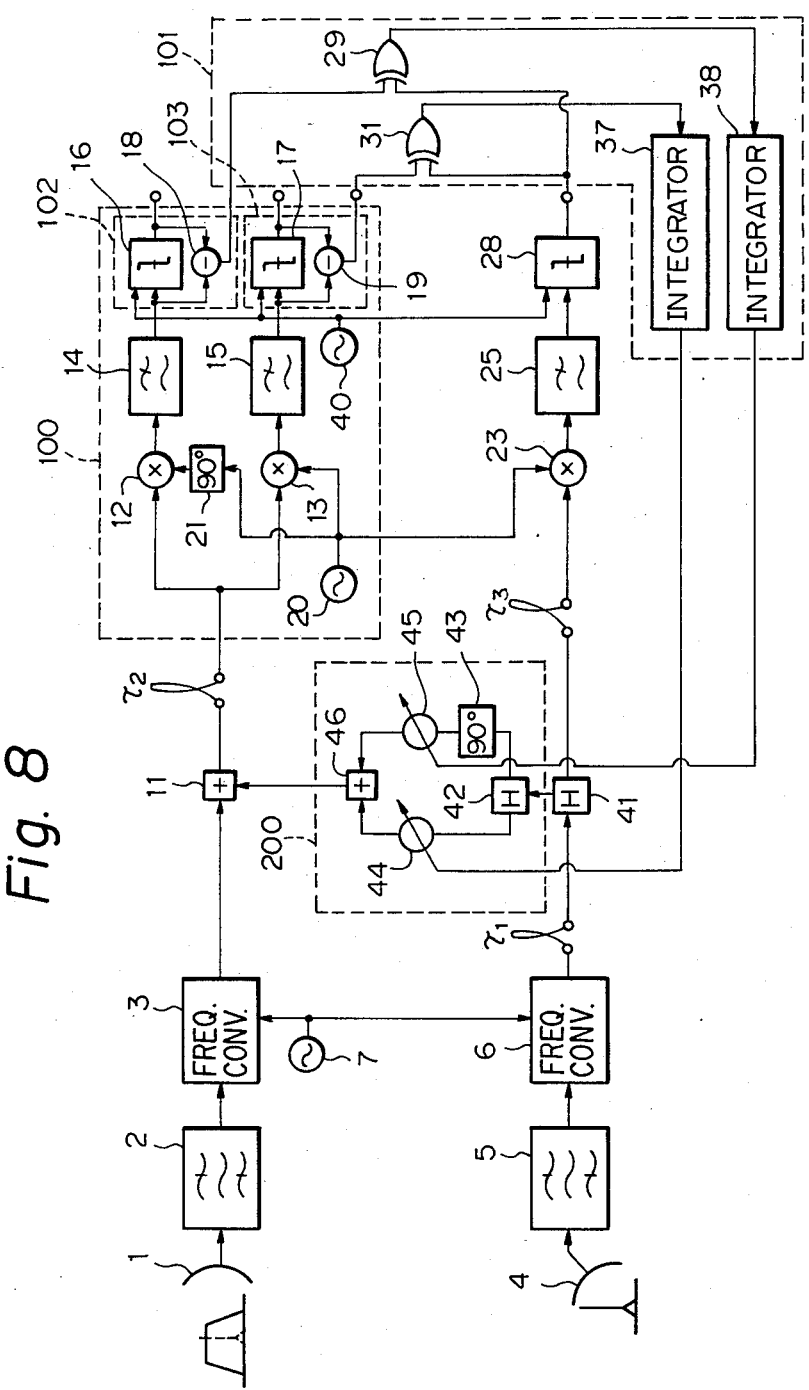
FIG. 8 is a block diagram of still another embodiment of the interference cancellation system according to the present invention.

FIG. 8 is the modification of the embodiment of FIG. 7, and the feature of FIG. 8 is the use of the quadrature amplitude modulator 200, instead of a variable attenuator and a variable phase shifter in FIG. 7. The structure and the operation of the quadrature amplitude modulator are described in accordance with FIG. 5.

Some other modifications are possible to those skilled in the art.

The above description was directed to 16 QAM signal as a main signal. Of course, the main signal in the present invention is not restricted to a 16 QAM signal, but any other signal, including a 4 PSK signal, and a 64 QAM signal is possible as a main signal. When a 4 PSK signal or a 64 QAM signal are used as a main signal, the number of output bits of an A/D converter must be designed according to the specific main signal.

An interference signal is not restricted to an amplitude modulation signal, which has been described. When an interference signal is an FM signal, $f(t)e^{j(\omega_2 t + \theta)}$ in the equations (1) and (2) is replaced by $fe^{j(\omega_2(t) \cdot t + \theta)}$. When an interference signal is a phase modulation signal, the term in the equations (1) and (2) is replaced by $fe^{j(\omega_2 t + \theta(t))}$. Also, when an interference signal is CW wave, the term is replaced by $fe^{j(\omega_2 t + \theta)}$.

In the embodiments of FIGS. 1, 3, 6, and 7, a divider 10 may be inserted at output of a variable attenuator, or at input of a variable phase shifter. Although the cancellation of interference signal is effected in IF stage in those embodiments, the cancellation in RF stage is of course possible.

In the above embodiments, the compensation signal is obtained by adjusting amplitude and phase of an interference signal which is received by an auxiliary antenna. It should be noted by course that the compensation signal may be obtained by adjusting amplitude and phase of the main signal received by the main antenna.

Further, the adjustment of phase of a signal may be effected either by adjusting a signal itself, or by adjusting phase of a local oscillator.

Further, a separate auxiliary antenna for receiving interference signal is not essential in the present invention. That auxiliary antenna may be omitted, if interference signal is obtained by another means.

In the above embodiments, error signal detectors 102 and 103 are implemented by an A/D converter which has more than 3 output bits when a 16 QAM signal occurs. And, an error signal is obtained by the third bit as shown in FIG. 4. When the $2^{2N}$ level QAM signal occurs, the demodulated baseband signal is a $2^N$ level signal. In that case, an A/D converter must have $N+1$ output bits so that the $(N+1)$'th output bit provides an error signal.

On the other hand, when a PSK signal in which the difference between each demodulated levels is not uniform, occurs, a mere single output bit of an A/D converter can not provide an error signal.

Figure 9:
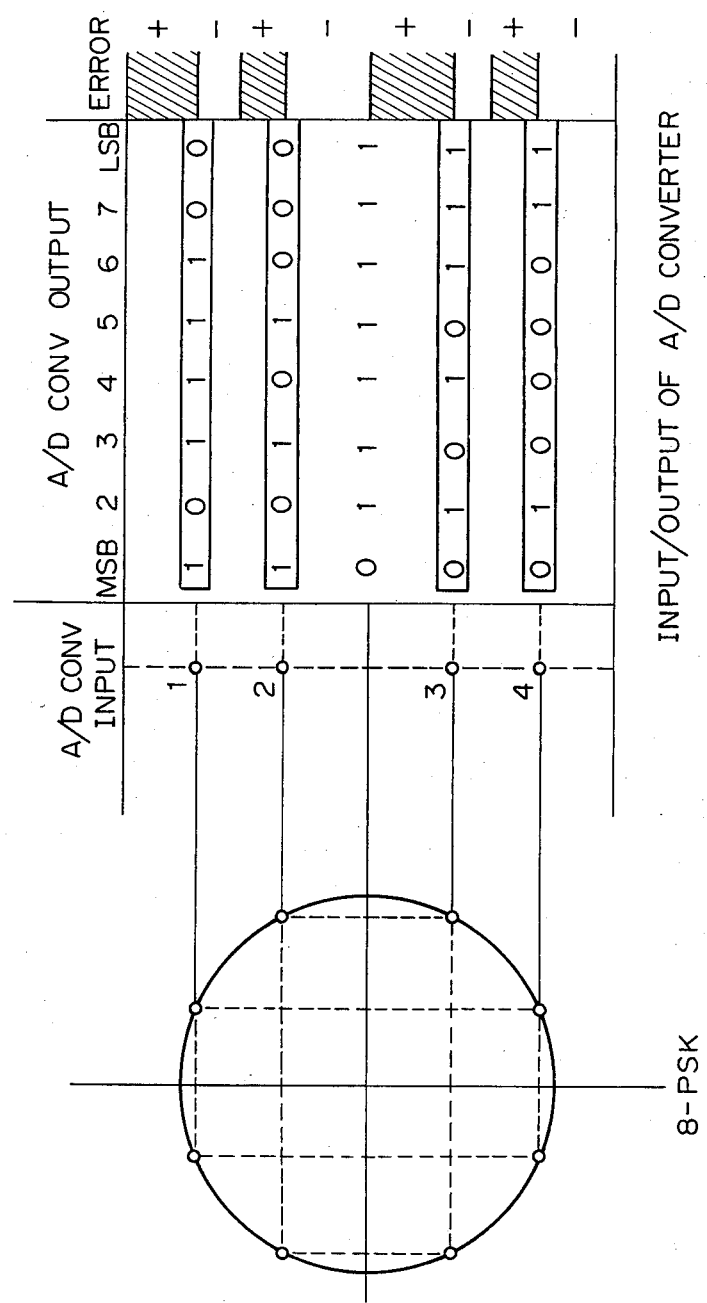
FIG. 9 shows diagram showing operation of an error signal detector.

In case of an 8 PSK signal, an operation of an error signal detector by an A/D converter is shown in FIG. 9, where an A/D converter has 8 output bits. When an 8 PSK signal is detected by a quadrature phase detector, the detected baseband signal has 4 levels, the difference of which is not uniform. When each of 4 levels is (10111100), (10101000), (01010111), and (01000011), as shown in FIG. 9, the error signal in the shaded area in FIG. 9 is positive, and the error signal in the non-shaded area is negative. Therefore, an error signal detector is designed so that 8 bits of the output signal of an A/D converter is monitored, and when an output signal resides in the shaded area in FIG. 9, it provides a positive error signal, otherwise, it provides a negative error signal. That operation is implemented by a simple conversion circuit which has a ROM.

Figure 10:
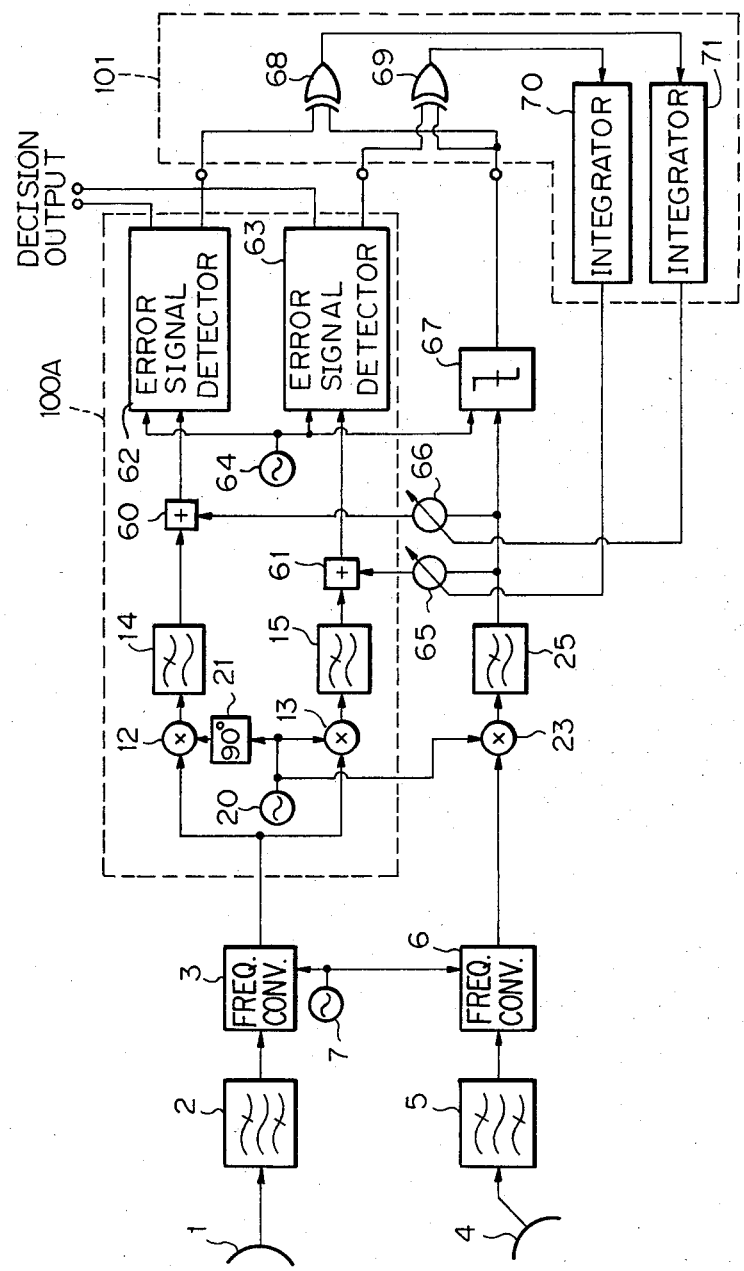
FIG. 10 is a block diagram of still another embodiment of the interference cancellation system according to the present invention.

FIG. 10 shows still another embodiment according to the present invention. The feature of the embodiment of FIG. 10 resides in that the cancellation of the interference signal is effected for the baseband signal at output of a quadrature phase detector, while the previous embodiments effected the cancellation for IF signal (or RF signal).

In FIG. 10, the numerals 1 through 7 are the same as those in FIG. 6. The demodulator 100A in FIG. 10 has quadrature phase detectors 12 and 13 which take the recovered reference carrier wave 20 for quadrature phase detection. The outputs of those detectors 12 and 13 are applied to the low-pass filters 14 and 15, respectively, to provide an in-phase baseband signal, and a quadrature baseband signal. A 90° phase shifter is provided at one of the quadrature phase detectors 12 and 13. On the other hand, an interference signal is phase-detected by the phase detector 23 which has the same carrier wave as that of the quadrature phase detectors 12 and 13. A baseband signal of an interference signal is obtained at an output of a low-pass filter 25 which is coupled with an output of the phase detector 23. A baseband interference signal at an output of the low-pass filter 25 is added to an in-phase component and a quadrature component of the main signal by the combiners 60 and 61, respectively, through a pair of bipolar attenuators 66, and 65, respectively. Those bipolar attenuators 65 and 66 can adjust the level of an input signal which has either a positive level, or a negative level. Thus, an interference signal in the main signal is cancelled by the combiners 60 and 61. A pair of error signal detectors 62 and 63 are coupled with outputs of the combiners 60 and 61, to pick up a residual interference component in the main signal. When the main signal is a 16 QAM signal, the demodulated baseband signal is a 4 level signal, and an error signal detector 62 and 63 is implemented by an A/D converter which has more than 3 output bits. The first two bits of the A/D converter are the decision outputs of the baseband digital signal, and the third bit is the error signal, as described in accordance with FIG. 4. The A/D converter uses the sampling clock signal 64 which is recovered by the demodulator 100A. Similarly, the interference signal is determined by the decision circuit 67 which uses the common clock signal 64 as that of the main signal. The control signal of the bipolar attenuators 65 and 66 are obtained by the correlation circuit 101, which takes the correlation between the error signal in the main signal and the interference signal.

The correlation circuit 101 has a multiplier 69 which provides the product of the interference signal at the output of the decision circuit 67 and the error signal detector 63 for the in-phase component. The output of the multiplier controls the bipolar attenuator 65 which is inserted in the in-phase path of the main signal, through the low-pass filter 70 (or integrator). Similarly, another multiplier 68 provides the product of the interference signal at the output of the decision circuit 67 and the error signal at the output of the error signal generator 62 for the quadrature component. The product of the multipler 68 controls the bipolar attenuator 66 in the quadrature path of the main signal through the low-pass filter 71. The multipliers 68 and 69 are implemented by an exclusive-OR circuit, since both input signal of the same are binary signals. Thus, an intererence component included in a main signal is cancelled.

Figure 11:
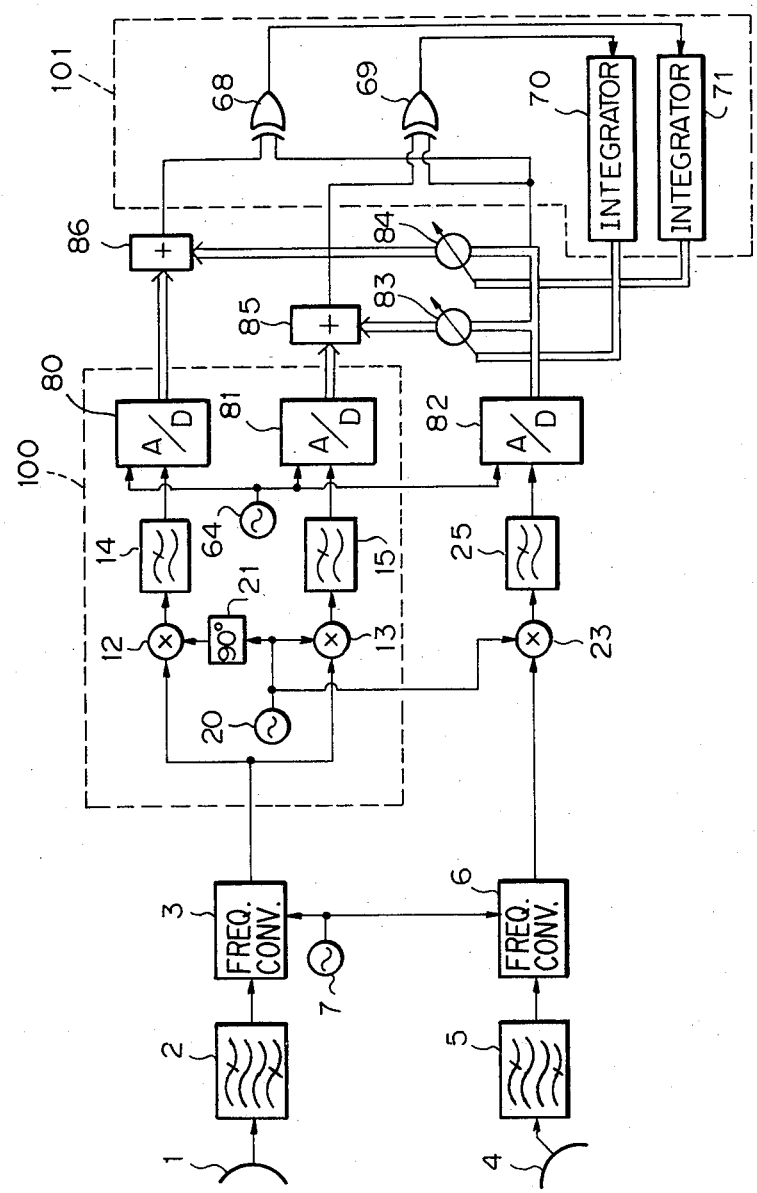
FIG. 11 is a block diagram of still another embodiment of the interference cancellation system according to the present invention.

FIG. 11 shows the modification of the embodiment of FIG. 10. The feature of FIG. 11 is that an interference cancellation is carried out by a digital circuit. In FIG. 11, the demodulated baseband signals at the outputs of the low-pass filters 14 and 15 (in-phase component, and quadrature component) are applied to A/D converters 80 and 81 which have sufficient quantization accuracy as compared with the number of levels of the demodulated baseband signal. The sampling timing clock 64 is the recovered clock signal from the main signal. Similarly, an intereference signal at the output of the low-pass filter 25 is applied to the A/D converter 82, which has sufficient quantization accuracy, and is supplied with the clock 64 which is recovered from the main signal. When the main signal is a 16 QAM signal, the A/D converters 80, 81 and 82 have preferably 8 output bits.

The output of the A/D converter 82 is applied to the bipolar variable attenuators 83 and 84, which are capable of calculating both a positive value and a negative value. The bipolar variable attenuator is implemented by a digital multiplier having 8×6 bits (8 bits of multiplicand, and 6 bits of multiplier). The output (8 bits) of the multiplier 83, and the output (8 bits) of the A/D converter 81 which handles the in-phase component of the main signal, are added in the full adder 85. The adder 85 provides the output (8 bits) of an in-phase component which is free from interference. Similarly, the full adder 86 provides the sum of the output of the bipolar variable attenuator 84 and the output of the A/D converter 80 for providing a compensated quadrature component.

The highest two bits of the output of each of the adders 85 and 86 are decision bits of 4 level signal, and other output bits (3'rd bit through 8'th bit) of the adders 85 and 86 are error signals. The third bit of the adders 85 and 86 shows the sign of an error signal. The highest bit (MSB) of the A/D converter 82 which digitalizes an interference signal shows the sign or the polarity of an interference signal.

The correlation of an error signal and an interfernce signal in FIG. 11 is taken only by handling the signs of each signal. The sign of the interference signal (the MSB of the A/D converter 82), and the sign of the in-phase error signal (the 3'rd bit of the adder 85), are applied to a multiplier 69, which is implemented by an exclusive-OR circuit. The output of the exclusive-OR circuit 69 is applied to a digital integrator 70, and the 6 bits of output of the integrator 70 is applied to the bipolar variable attenuator 83 as a control signal of the same. Similarly, the sign of the interference signal (the MSB of the A/D converter 82), and the sign of the quadrature error signal (3'rd bit of the adder 86) are applied to the digital multiplier 68, which is implemented by an exclusive-OR circuit. The output of the exclusive-OR circuit 68 is applied to a digital integrator 71, the 6 output bits of which are applied to the bipolar variable attenuator 84 as a control signal of quadrature component. Therefore, the interference cancellation is carried out for a baseband signal by using only a digital circuit (an analog circuit is not used). The digital integrator 70, and 71 is implemented by an up-down counter, which has more than 6 bits. The product of the exclusive-OR circuit is applied to an up-down input terminal of the counter, and the highest 6 bits of the counter are used as a control signal which is applied to a bipolar variable attenuator.

Figure 12:
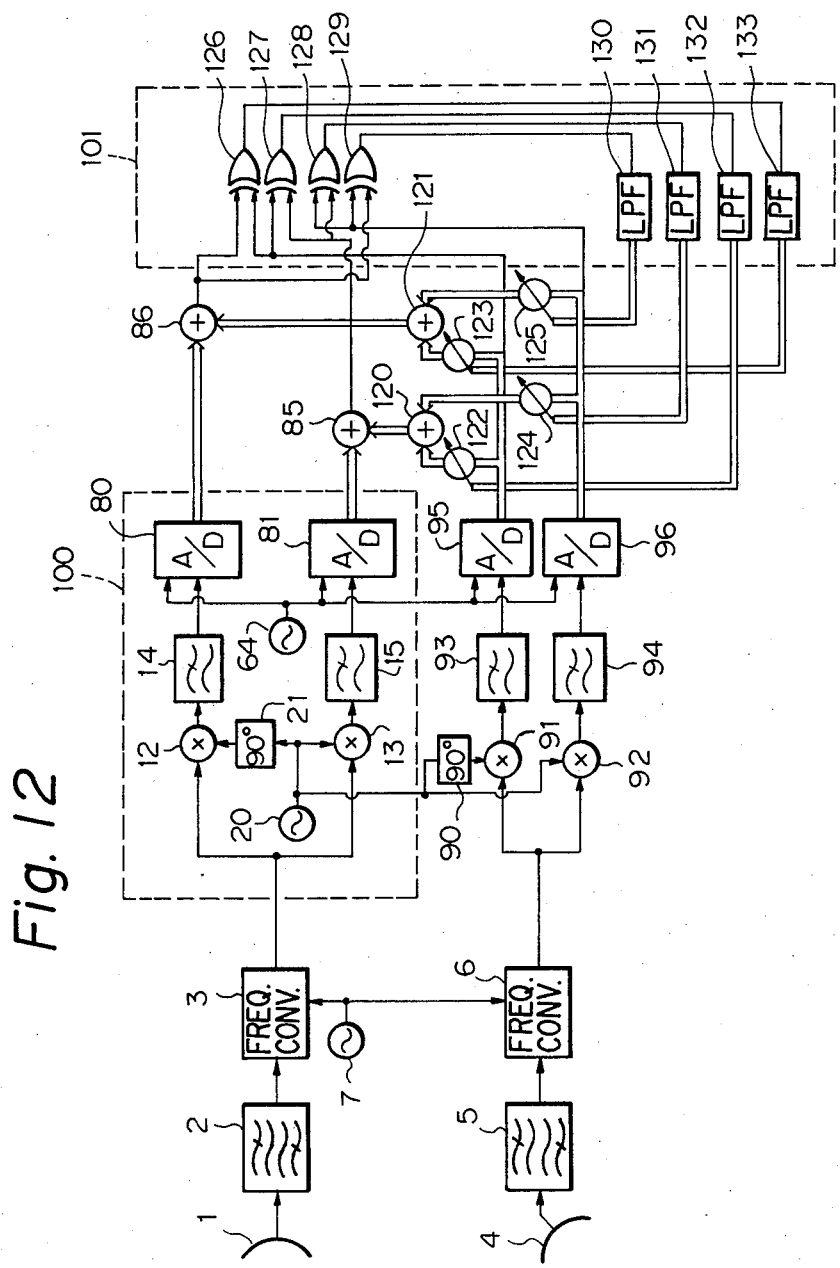
FIG. 12 is a block diagram of still another embodiment of the interference cancellation system according to the present invention.

FIG. 12 is still another embodiment of the present invention, in which the interference cancellation is carried out for a baseband signal by using only a digital circuit. The interference signal in FIG. 12 is demodulated by a quadrature phase detector (91, 92, 93, 94), while a phase detector (23, 25) is used in FIG. 11. Therefore, the operation of FIG. 12 is similar to that of FIG. 5, except that the cancellation is carried out for the baseband signal, and that only a digital circuit is used. In FIG. 12, the numerals 80, 81, 95 and 96 are A/D converters, the numerals 120, 121, 85 and 86 are full adders, the numerals 123, 124, 125 and 126 are bipolar variable attenuators which are implemented by digital multipliers, the numerals 126, 127, 128 and 129 are multipliers which are implemented by exclusive-OR circuits, the numerals 130, 131, 132, and 133 are low-pass filters or digital integrators which are implemented by up-down counters.

When a combiner is inserted in a baseband stage, it is preferable to use a quadrature phase detector for demodulating an interference signal. In that case, any interference signal may be compensated. When a mere phase detector is used for an interference signal and a combiner is in a baseband stage, an interference signal to be compensated must satisfy some conditions.

Figure 13:
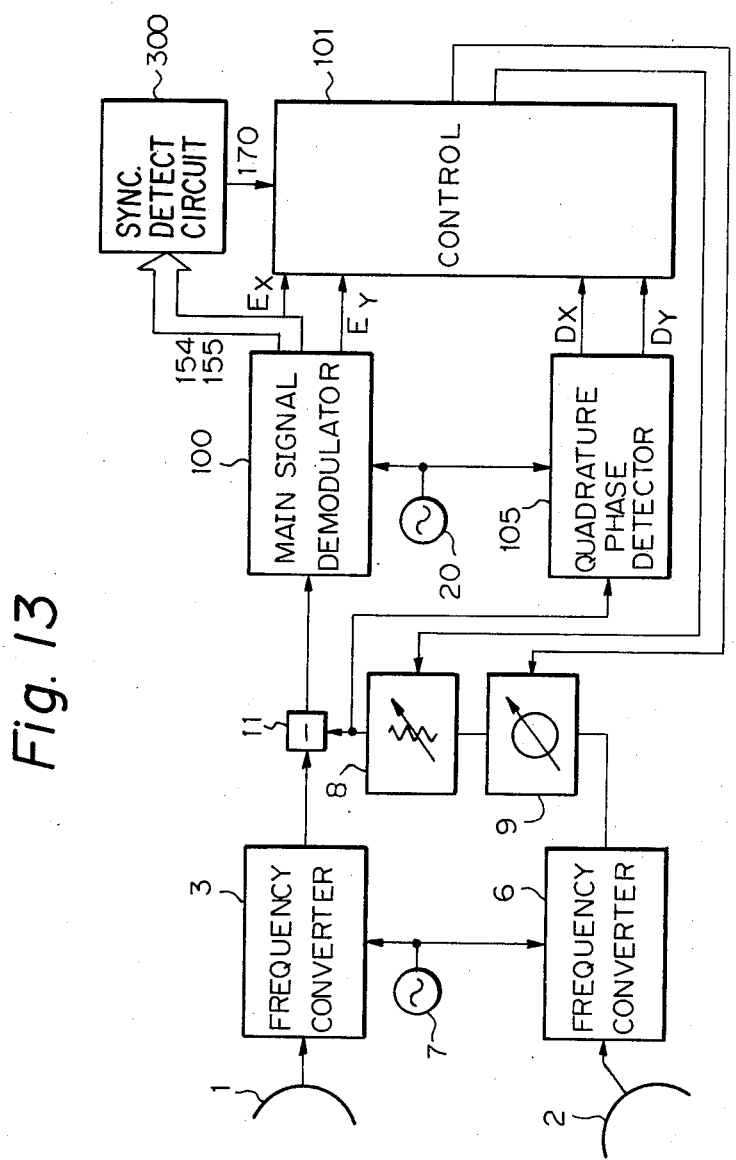
FIG. 13 is a block diagram of still another embodiment of the interference cancellation system according to the present invention.
Figure 14:
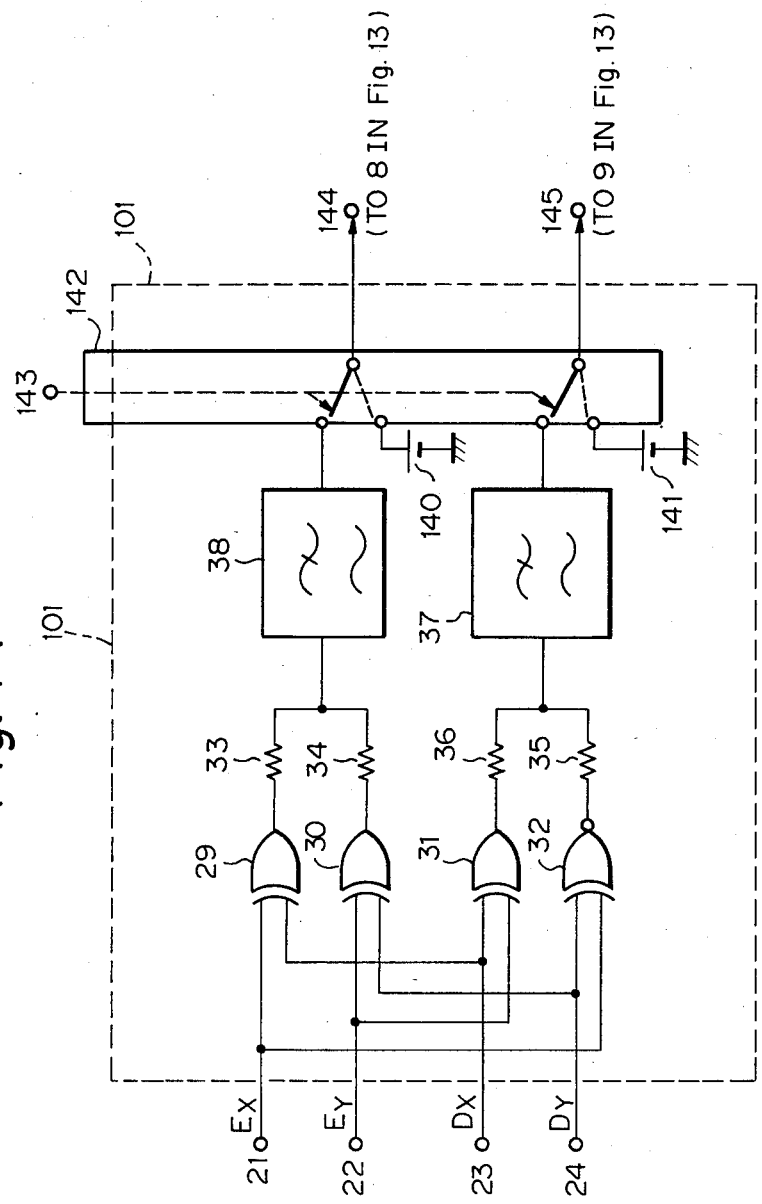
FIG. 14 is a block diagram of the control circuit in FIG. 13.
Figure 15:
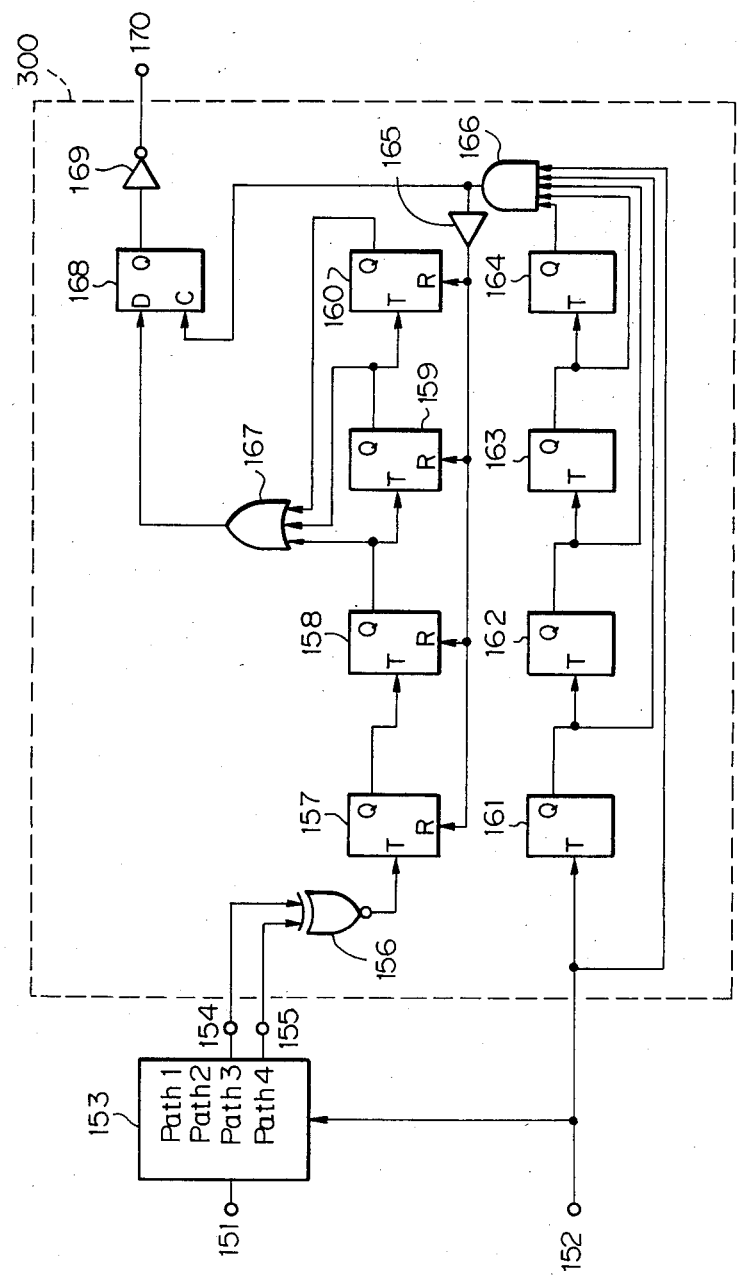
FIG. 15 is a block diagram of the asynchronization detector in FIG. 13.

One of the modifications of the present invention is now described in accordance with FIGS. 13 through 15. That modification has a feature that the interference cancellation described in accordance with FIGS. 1 through 12 is effected, only when a reception signal is in synchronized condition. It should be appreciated that the circuit according to the present invention operates correctly, only when a reception signal is in synchronization condition. When a reception signal is asynchronous, an error signal detected according to the present invention is wrong, and therefore, a variable attenuator and/or a variable phase shifter for interference cancellation can not be controlled correctly. If the present compensation system operates in asynchronous condition, it would not only operate in correctly, but also give a bad effect to a desired main signal.

Therefore, the modification of FIGS. 13 through 15 has a switching circuit which enables the interference compensation operation only when a reception signal is in a synchronized condition.

FIG. 13 is a brief block diagram, which is applicable to all the embodiments described. For the sake of the easy understanding, the embodiment of FIGS. 13 through 15 is directed to the modification of the embodiment of FIG. 3. In comparing FIG. 13 with FIG. 3, the modification of FIG. 13 has the features that the synchronization detection circuit 300 is provided, and that an analog switch 143 (in FIG. 14) is provided in the control circuit 101. The embodiment of the synchronization detection circuit 200 is shown in FIG. 15.

It is assumed that a desired main signal is a 16 QAM signal, which provides a 4 level in-phase component, and a 4 level quadrature component. The in-phase component is applied to an A/D converter which operates as a decision circuit as described before. It is supposed that the A/D converter has more than 4 output bits, although the A/D converter in the previous embodiments for a 16 QAM signal has only 3 bits. The first output bit (Most Significant Bit) of the A/D converter, and the second bit of the same show the decision signals of a desired signal. The third bit of the A/D converter shows the sign (positive or negative) of an error signal as described before. So, the third bit $E_x$ of the in-phase component, and the third bit $E_y$ of the quadrature component are applied to the control circuit 101. The fourth bit of the A/D converter shows the amplitude of the error signal. Accordingly, the exclusive-NOR circuit 156 (FIG. 15) which provides the exclusive-NOR logic operation beween the third bit and the fourth bit of the A/D converter provides an output signal which relates an amount of intersymbol interference. When the output of said exclusive-NOR circuit 156 is "0", the intersymbol interference is small, and when the output is "1", the intersymbol interference is large. The synchronization detection circuit in FIG. 15 recognizes the asynchronization condition when there exist more than 2 time slots which have the large intersymbol interference in $2^4=16$ time slots. The system is in a synchronized condition when the number of the time slots which have the large intersymbol interference is less than that value (=2). In FIG. 15, the numerals 157, 158, 159, 160, 161, 162, 163, 164, and 168 are flip-flops, the numerals 165 is a delay gate and 169 is an inverter, 166 is an AND circuit, 167 is an OR circuit, and 170 is an output terminal. The output signal at the output terminal 170 is "1" when it is synchronous, and that output signal is "0" when it is asynchronous. That output signal at the terminal 170 is applied to the analog switch control 143 of the switch 142 (FIG. 14). Accordingly, when it is synchronized, the control signal at the output of the low-pass filters (or integrators) 37, and 38 is coupled with the output terminals 145 and 144 in order to control the variable attenuator 8 (FIG. 13) and the variable phase shifter 9 (FIG. 13). When it is in a asynchronous condition, the fixed potentials 140 and 141 are applied to the variable attenuator 8 and the variable phase shifter 9 through the output terminals 144 and 145. The interference cancellation stops of course when the fixed potentials are provided. The analog switch 142 in FIG. 14 is implemented either by a conventional relay switch, or a conventional semiconductor analog switch. The fixed potential is designed so that the output level of the variable attenuator becomes the minimum.

Figure 16:
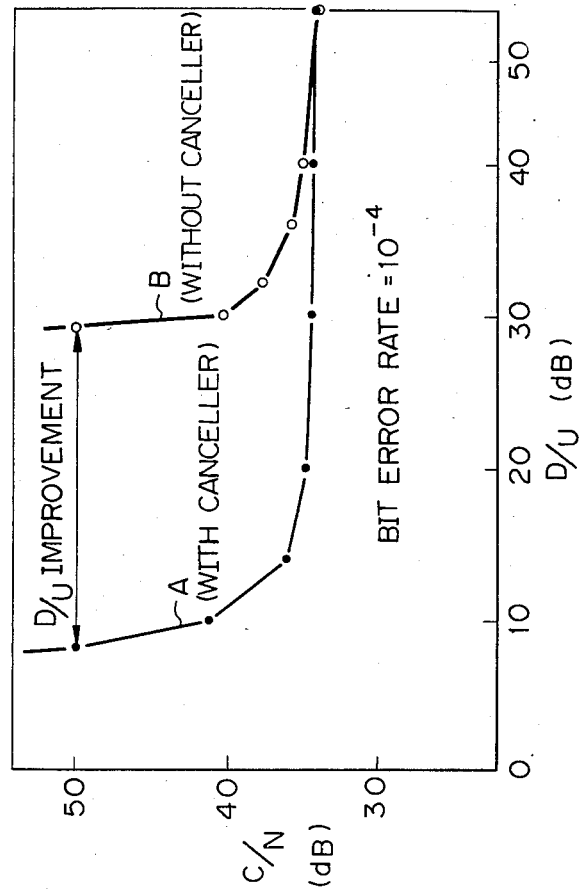
FIG. 16 shows experimental results of the present invention.
Figure 17:
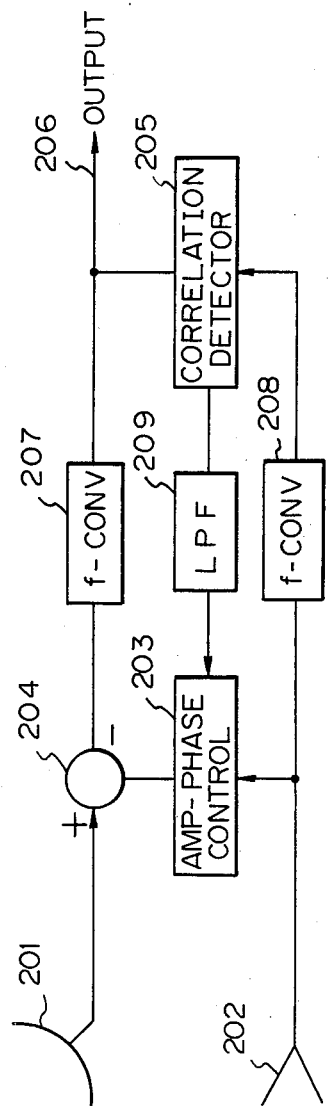
FIG. 17 is a block diagram of a prior interference cancellation system.

FIG. 16 shows the experimental results of the present invention, in which the circuit of FIG. 6 is used. In the experiment, the main signal is a 256 QAM signal (Symbol rate is 12.5 MB), and an interference signal is a FM signal. The horizontal axis shows the D/U ratio (dB) between a desired signal level and an undesired signal level, and the vertical axis shows the C/N ratio (dB) between the carrier signal level and the thermal noise level, and the bit error rate (BER) is $10^{-4}$. The equal BER of $10^{-4}$ curve A shows the characteristics of the present invention, and the curve B shows the characteristics in which no cancellation means is used. As shown in FIG. 16, the D/U improvement by the present invention is more than 20 dB. In other words, when no cancellation means is used, the D/U ratio must be higher than 30 dB irrespective of the C/N ratio, while the D/U ratio may be less than 10 dB when the present invention is used. This experiment confirms that this invention performs very well.

As described above in detail, according to the present invention, a compensation signal has the same amplitude and the opposite phase as that of an interference included in a desired main signal. An interference signal is not restricted to the particular modulation signal, but any modulation signal is compensated.

Further, it should be noted that a demodulator for a main signal doubles as an error signal detector of the present invention. Therefore, no additional circuit for an error signal detector is required in the present invention. All that are required in the present invention to modify a conventional receiver for interference compensation are a phase detector for an interference signal, a multiplier (or an exclusive-OR circuit) and a low-pass filter for taking correlations between an interference signal and an error signal. An A/D converter is included inherently in a QAM receiver, so no additional A/D converter is required in the present invention.

Therefore, a simple circuit can control a variable attenuator and a variable phase shifter to cancel an interference component.

From the foregoing, it will now be apparent that a new and improved interference cancellation system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. An interference cancellation system comprising:
   (a) a main signal reception means for receiving a main signal of a desired digital signal and an undesired interference signal;
   (b) an auxiliary signal reception means for receiving said undesired interference signal;
   (c) a control means for providing a compensation signal having an amplitude and anti-phase equal to an amplitude and anti-phase of the undesired interference signal in the main signal;
(d) a combiner for combining the main signal and an output of said control means to cancel the undesired interference signal in the main signal;
(e) a quadrature phase detector for demodulating the main signal;
(f) a phase detector for phase detecting the undesired interference signal, said phase detector being supplied with a clock signal obtained by said quadrature phase detector for the main signal;
(g) a decision circuit coupled with an output of said quadrature phase detector, to provide a demodulated digital signal;
(h) an error signal detector for providing a difference between a decision level of said desired digital signal detector and an output of said quadrature phase detector;
(i) a correlation means for providing a correlation between an output of said error signal detector and an output of the phase detector for said undesired interference signal; and
(j) said control means being controlled by an output of said correlation means.

2. An interference cancellation system according to claim 1, wherein said combiner is inserted in one of an IF stage and a RF stage.

3. An interference cancellation system according to claim 1, wherein said combiner is inserted in a baseband stage.

4. An interference cancellation system according to claim 1, wherein said control means comprises a variable attenuator and a variable phase shifter.

5. An interference cancellation system according to claim 1, wherein said control means is implemented by a quadrature amplitude modulator which comprises a pair of bipolar variable attenuators, a 90° phase shifter coupled with an input of one of said variable attenuators, and a combiner for combining outputs of said variable attenuators.

6. An interference cancellation system according to claim 1, wherein said phase detector for phase detecting said undesired interference signal is a quadrature phase detector.

7. An interference cancellation system according to claim 1, wherein said correlation means comprises at least two multipliers for providing a product of an error signal of an in-phase component and said undesired interference signal, and a product of an error signal of a quadrature component and said undesired interference signal, and at least two low-pass filters each coupled with a related output of said multipliers, so that outputs of said low-pass filters control amplitude and phase of said control means.

8. An interference cancellation system according to claim 7, wherein said multiplier is implemented by an exclusive-OR circuit, and said low-pass filter is implemented by a digital integrator.

9. An interference cancellation system according to claim 1, wherein said correlation means has a switch which supplies a correlation signal to said control means only when a reception signal is in a synchronized condition, and said switch supplies a fixed control signal to said control means when said reception signal is in an asynchronous condition.

10. An interference cancellation system according to claim 1, wherein said error signal detector is implemented by an A/D converter, which doubles as a decision circuit.

* * * * *